United States Patent [19]

Dwyer et al.

[11] Patent Number: 4,818,509

[45] Date of Patent: Apr. 4, 1989

[54] CONTINUOUS PROCESS FOR MANUFACTURING CRYSTALLINE ZEOLITES IN CONTINUOUSLY STIRRED BACKMIXED CRYSTALLIZERS

[75] Inventors: Francis G. Dwyer, West Chester; Albert B. Schwartz, Philadelphia, both of Pa.

[73] Assignee: Mobil Oil Corporation, New York, N.Y.

[21] Appl. No.: 921,704

[22] Filed: Oct. 21, 1986

Related U.S. Application Data

[63] Continuation of Ser. No. 864,748, May 13, 1986, abandoned, which is a continuation of Ser. No. 799,294, Nov. 20, 1985, abandoned, which is a continuation of Ser. No. 592,684, Mar. 23, 1984, abandoned.

[51] Int. Cl.$^4$ .............................................. C01B 33/28
[52] U.S. Cl. .................................................... 423/329
[58] Field of Search ...................... 423/328, 329, 333; 502/77, 232

[56] References Cited

U.S. PATENT DOCUMENTS

| | | | |
|---|---|---|---|
| 2,882,244 | 4/1959 | Milton et al. | 423/328 C |
| 3,071,434 | 1/1963 | Frilette et al. | 423/329 |
| 3,228,969 | 1/1966 | Kerr | 260/448 |
| 3,692,475 | 9/1972 | Johnson | 423/329 |
| 3,702,886 | 11/1972 | Argauer et al. | 423/328 |
| 3,898,319 | 8/1975 | Weber | 423/329 |
| 4,041,135 | 8/1977 | Williams et al. | 423/329 |
| 4,088,739 | 5/1978 | Vaughan et al. | 423/329 |
| 4,164,551 | 8/1979 | Elliott, Jr. | 423/329 |
| 4,199,556 | 4/1980 | Plank et al. | 423/329 |
| 4,222,995 | 9/1980 | Roebke et al. | 423/328 C |
| 4,267,158 | 5/1981 | Christophliemk et al. | 423/329 |
| 4,330,518 | 5/1982 | Kostinko | 423/328 C |
| 4,336,234 | 6/1982 | Leutner et al. | 423/329 |
| 4,371,510 | 2/1983 | Christophliemk et al. | 423/329 |
| 4,372,931 | 2/1983 | Ambs | 423/328 C |
| 4,385,042 | 5/1983 | Whitehurst et al. | 423/328 C |
| 4,493,902 | 1/1985 | Brown et al. | 502/65 |

FOREIGN PATENT DOCUMENTS

| | | |
|---|---|---|
| 0025799 | 11/1983 | European Pat. Off. . |
| 0173895 | 3/1986 | European Pat. Off. . |
| 0173901 | 3/1986 | European Pat. Off. . |
| 2333068 | 3/1975 | Fed. Rep. of Germany . |
| 2807660 | 8/1978 | Fed. Rep. of Germany . |
| 1476957 | 6/1977 | United Kingdom . |
| 1598042 | 9/1981 | United Kingdom . |

OTHER PUBLICATIONS

Breck, D., "Zeolite Molecular Sieves", Wilely & Sons, 1974, pp. 725-735.

*Primary Examiner*—John Doll
*Assistant Examiner*—R. Bruce Breneman
*Attorney, Agent, or Firm*—Alexander J. McKillop; Charles J. Speciale; Marina V. Schneller

[57] ABSTRACT

A continuous process is described for manufacturing a wide variety of zeolites having selected crystal sizes and other desired characteristics. Selected raw materials are fed to a precursor tank of relatively large capacity, wherein the resultant zeolite precursor slurry is held at temperatures of up to 180° F. for 4-16 hours, with high shear agitation, as an induction period. The slurry is sent to a plurality of crystallization tanks before it possesses a total solids content exceeding 10% by weight and a crystalline content exceeding 15% by weight of the total solids content. The crystallization tanks are preferably operated in two stages. The first crystallizing stage is held at a temperature of 180°-250° F. for 2-72 hours. The second crystallizing stage is held at a temperature greater than 250° F. for 2-16 hours.

15 Claims, 4 Drawing Sheets

SCHEME A

SCHEME A

SCHEME B

SCHEME C

SCHEME D

SCHEME E

CONTINUOUS PROCESS FOR MANUFACTURING CRYSTALLINE ZEOLITES IN CONTINUOUSLY STIRRED BACKMIXED CRYSTALLIZERS

CROSS REFERENCE TO RELATED APPLICATION

This application is a continuation of application Ser. No. 864,748 filed May 13, 1986, now abandoned which is a continuation of application Ser. No. 799,294 filed Nov. 20, 1985 now abandoned which is turn is a continuation of application Ser. No. 592,684 filed Mar. 23, 1984 now abandoned.

FIELD OF THE INVENTION

This invention relates generally to an improved method of preparing crystalline porous siliceous solids, zeolites being a preferred form thereof. It particularly relates to an improved method of making crystalline zeolites on a continuous basis.

DESCRIPTION OF THE PRIOR ART

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid threedimensional framework of $SiO_4$ and $AlO_4$ in which the tetrahedra are cross-linked by the sharing of oxygen atoms to oxygen is 1:2. The electrovalence of the tetrahedra containing aluminum is balanced by the inclusion in the crystal of a cation, for example, an alkali metal or an alkaline earth metal cation This inclusion can be expressed by a formula wherein the ratio of the number of aluminum ions to the number of various cations, such as $Ca/2$, $Sr/2$, Na, K, or Li, is equal to unity. One type of cation may often be exchanged either entirely or partially by another type of cation, utilizing ion-exchange techniques in a conventional manner. By means of such cation exchange, it has been possible to vary the properties of a given aluminosilicate by suitable selection of the cation. The spaces between the tetrahedra are usually occupied by molecules of water prior to dehydration. hydration.

Prior art techniques have resulted in the formation of a great variety of synthetic aluminosilicates. These aluminosilicates have come to be designated by letters or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. NO. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), zeolite ZSM-35 (U.S. Pat. No. 4,016,245), zeolite ZSM-21 and ZSM-38 (U.S. Pat. No. 4,046,859), and zeolite ZSM-23 (U.S. Pat. No. 4,076,842), merely to name a few.

High silica-containing zeolites are well known in the art and it is generally accepted that the ion-exchange capacity of a crystalline aluminosilicate is directly dependent upon its aluminum content. Thus, for example, the more aluminum there is in a crystalline structure, the more cations are required to balance the electronegativity thereof, and when such cations are of the acidic type such as hydrogen, they impart tremendous catalytic activity to the crystalline material. On the other hand, high silica-containing zeolites, having little or substantially no aluminum, may have important properties and characteristics and a high degree of structural stability such that they have become candidates for use in various processes including catalytic processes. Materials of this type are known in the art and include high silica-containing aluminosilicates such as ZSM-5, ZSM-11, and zeolite ZSM-12, to mention a few.

The silica-to-alumina ratio of a given zeolite is often variable; for example, zeolite X can be synthesized with silica-to-alumina ratio of from 2 to 3; zeolite Y from 3 to about 6. In some zeolites, the upper limit of silica-to-alumina ratio is unbounded. ZSM-5 is one such example wherein the silica-to-alumina ratio is at least 5. U.S. Pat. No. 3,941,871 discloses a crystalline metal organosilicate essentially free of aluminum and exhibiting an x-ray diffraction pattern characteristic of ZSM-5 type aluminosilicates. U.S. Pat. Nos. 4,061,724; 4,073,865; and 4,104,294 describe microporous crystalline silicas or organosilicates wherein the aluminum content present is at impurity levels.

The expression "high silica-containing crystalline material" is intended to define a crystalline structure which has a silica-to-alumina ratio greater than 500 and more preferably greater than 1000 up to and including those highly siliceous materials where the silica-to-alumina ratio is infinity or as reasonably close to infinity as practically possible. Such zeolites are sometimes described as having all-silica end members. This latter group of highly siliceous materials is exemplified by U.S. Pat. Nos. 3,941,871; 4,061,724; 4,073,865; 4,104,294 wherein the materials are prepared from reaction solutions which involve no deliberate addition of aluminum. However, trace quantities of aluminum are usually present due to the impurity of the reaction solutions. It is to be understood that the expression "high silica-containing crystalline material" also specifically includes those materials which have other metals besides silica and/or alumina associated therewith, such as boron, iron, and chromium, etc. For the purposes of this invention, highly siliceous zeolites is a term that hereinafter includes the high silica-containing crystalline materials as well as those having a silica-to-alumina ratio as low as one and will generally be abbreviated as simply zeolites.

Such synthetic zeolites have been manufactured by a wide variety of processes. The most important prior art references that relate to manufacturing processes and particularly to continuous processes are described hereinafter.

U.S. Pat. No. 3,071,034 describes a continuous process for manufacturing zeolitic molecular sieves of the "A" series which comprises continuously preparing a soidum oxide-silica-alumina-water reaction mixture having a composition, expressed in terms of oxide-mole ratios, falling within the following ranges:

$Na_2O/SiO_2$ from 0.8 to 3.0
$SiO_2/Al_2O_3$ from 0.5 to 2.5

H₂O/Na₂O from 35 to 200

The process further comprises maintaining this reaction mixture at 20°–175° C. until crystals of uniform size and a desired type are formed, then continuously withdrawing a portion of the resulting slurry which contains 10–90% of the ultimate product, continuously adding the withdrawn portion to a fresh supply of the mixture, and separating crystalline sodium aluminosilicate product from the remainder of the slurry.

U.S. Pat. No. 3,321,272 teaches an inherently batch process for synthesizing crystalline aluminosilicate molecular sieves of the X, Y, L, D, or ZK series by controlling the purity of the prereaction saturate for at least one of the reactants and/or the purity of a seed zeolite, the rates of adding the reactants, and the amount of stirring after mixing thereof. It was found that if either the saturant or the seed was impure, the yield of pure material was decreased. The population growth law set forth in U.S. Pat. No. 3,071,034 was also found to be applicable. This law states that the rate of growth of new crystal, once a substantial amount of crystal is already present in the reaction mixture, is in accord with the formula:

$$\log C_f/C_i = kT,$$

in which $C_f$ is the final crystal weight in a unit volume of slurry and $C_i$ is the initial crystal weight at the beginning of a term interval, T, plus the weight of residual solids at that time. The constant, k, is governed by the temperature and concentration of NaOH in the reaction mixture.

U.S. Pat. No. 3,425,800 describes a continuous process for making selected zeolite crystals. Sodium silicate solution and Bayer liquor are added to a batch mixing tank wherein agitation at room temperature instantaneously forms a homogenous suspension of zeolitic gel in clear liquor. This suspension is transferred to a holding tank and then fed through a heating tank, wherein its temperature is increased to a temperature of 70°–150° C. (preferably, about 100° C.) to the central stratum of a crystallizer having a central downcomer through which the suspension is fed, an overflow, a conical bottom, a central slurry discharge line, and a revolving rake. The central stratum is a suspension of a metal-alumino-silicate zeolitic gel in clear liquor which contains water and unused dissolved reactants. The clear liquor constitutes all of the upper stratum in the crystallizer, about 90% of the central stratum, and about half of the lower or crystalline stratum. The synthetic zeolite crystals form in this central stratum and settle downwardly into the lower stratum while the clear liquor moves upwardly. The rake moves the slurry in the lower stratum into the discharge line as the underflow.

U.S. Pat. No. 3,692,475 relates to batch manufacturing of crystalline zeolite Y by heating an aqueous alkaline silica-containing solution at 180°–230° F. (82°–110° C.), agitating and adding to the hot solution a dilute aqueous sodium aluminate solution having an Al₂O₃ content not greater than 6% by weight to provide an SiO₂:Al₂O₃ ratio of from 18:1–30:1 to form a reaction mix, and heating the reaction mix with continuous agitation at a temperature from its boiling point to about 230° F. (110° C.) for 1–6 hours.

U.S. Pat. No. 3,702,886 describes a method for making ZSM-5 zeolites by preparing a solution containing tetrapropyl ammonium hydroxide, sodium oxide, aluminum oxide, and water within a selected range of ratios digesting the gel particles by heating the solution at 150°–175° C. for a period of time from 12 hours to 8 days, separating the solid product from the reaction medium, filtering, water washing, and drying. Ion exchanging with a desired cation, washing, drying, and calcining may then be done.

U.S. Pat. No. 3,709,979 provides a procedure for making ZSM-11 catalyst by a batch procedure similar to that for ZSM-5 at temperatures of 100°–200° C. under pressure for unstated periods of time.

U.S. Pat. No. 3,832,449 teaches the batch preparation of zeolite ZSM-12 by preparing a solution containing tetraethyl ammonium cations, sodium oxide, aluminum oxide, silicon oxide, and water and having a selected range of ratios, maintaining the solution at 150°–170° C. for 5–12 days (preferred conditions) until the gel particles are digested and crystals of the zeolite are formed, and then separating and recovering the crystals.

According to U.S. Pat. No. 4,041,135, efforts to develop commercially feasible continuous systems or economical batch-type systems have been seriously hampered by the formation of a gel structure during the reaction cycle. Because of the formation of the gel, very cumbersome and costly processing steps and equipment are required. Also, in such processes there may be a carry-over of the gel in the final crystalline product. The gel is an inert diluent and impurity which seriously reduces the specific or unit volume capacity of the product. There is no known method for separation of this gel contaminant. This patent overcomes such gel problems with a nine-step process which comprises sodium aluminate make-up (utilizing recycle liquor and purification thereof), sodium silicate make-up, batch addition of the purified sodium aluminate solution to the sodium silicate solution in a precipitationdigestion vessel at a controlled rate so that the time of addition is 10–60 minutes while agitating, and crystallizing at 170°–230° F. for 1–8 hours (while exercising careful time and temperature control to obtain desired crystal species, size and purity), and finally settling the crystals, quenching the supernatant liquor in order to avoid spurious crystalline phases and control crystal growth, decanting the supernatant liquor, and removing the crystal slurry to a vacuum filter and finally to a spray dryer. The product has a total exchange capacity of at least 250 mg CaCO₃ per gram of crystalline inorganic base exchange material and an initial hardness exchange rate of at least 2 grains per gram per minute. The crystal size is in the range of 0.25–8.0 microns. The process utilizes total recycle of the process liquor.

U.S. Pat. No. 4,088,739 describes a technique for producing synthetic ferrierites having the absorption and catalytic properties characteristic of 5–8 Å zeolites by preparing a precursor mixture which must be alkaline (preferably pH 8–14) and heating the mixture under autogenous pressure at 180°–325° C. for 0.5–7 days, depending inversely upon the temperature. The alkaline reaction mixture comprises Group I and/or Group II cations, a source of silica, a source of alumina, and lithium cations. The promoted reaction mixture is seeded with natural or synthetic ferrierite seeds to form the precursor mixture. Natural ferrierite is characterized by having the sum of its moles of alkali and alkaline earth oxides equal to the sum of the moles of alumina and ferria.

U.S. Pat. No. 4,267,158 discloses a continuous process for preparing x-ray amorphous sodium aluminosilicates, having a particle size of less than 50 microns and useful as a zeolitic precursor, by continuously mixing an aqueous sodium aluminate solution with an aqueous sodium silicate solution in the presence of excess sodium hydroxide solution and at temperatures above ambient. Formation of an immobilizing gel is avoided by staged mixing of all of either the aluminate or the silicate component with a continuously added portion (one-third to one-fifth) of the other component, and the staged sequential addition and mixing of the remaining portion while maintaining a mean holding time for each adding-/mixing stage that is approximately 5–10 times greater than the calculated mixing time. Suitable mean holding times are at least 5 seconds; preferred temperatures are 50°–80° C.

U.S. Pat. No. 4,278,649 relates to the same process as U.S. Patent 4,267,158 but discloses an elongated and substantially circular cross-sectional reaction zone, having a length: diameter ratio exceeding 500, for carrying out the initial additions and mixing and the sequential additions and mixings thereafter.

Zeolite crystallization is commonly conducted in large autoclaves, either static or stirred, and frequently requires many hours for completion; it can be, by petroleum industry standards, labor-intensive. Manufacturing processes for commercial zeolites can be classified into two groups, those using homogeneous or heterogeneous hydrogels and those based on pre-formed gels. The hydrogel processes conventionally employ large vats or autoclaves for stepwise mixing, gel aging, and final crystallization, and several examples are reviewed in Chapter 9 of the book "Zeolite Molecular Sieves" by D. W. Breck, published in 1974. Although it is possible to crystallize some of these zeolites in a continuous-stream process, batch processes of stepwise type are generally preferred due to the meta-stability of zeolite species and to the tendency towards nucleation and growth of undesirable zeolite phases such as P, sodalite, and analcime in the cases of zeolites X and Y, zeolite A, and mordenite, respectively.

Characterizing these conventional zeolite preparations, in addition to the frequent existence of competing zeolite product phases, has been a zeolite product of $SiO_2/Al_2O_3$ ratio $\approx 10$ and a high alkalinity, with pH exceeding 12 and often exceeding 14. Expressed in terms of $OH/SiO_2$ mole ratios, the alkalinity of typical reaction mixture compositions used in the production of zeolites A, X, and Y are given by D. W. Breck on his page 316, as 4.8, 2, and 1, respectively.

A continuous process would be desirable because it would: (1) be energy efficient by eliminating the high energy consumption that is required for repeated heat-up and cool-down of batch crystallizers; (2) require smaller equipment and possibly lower capital costs that are inherent in a continuous process as compared to a batch process at the same production rate; and (3) produce a more uniform product because of the more readily controlled operating conditions.

Plug flow continuous crystallization systems have not been very successful because the relatively slow kinetics of crystallization require operation at low flow rates in order to obtain the required residence times. At such low flow rates, mass and heat transfer rates are low and can result in non-uniform products and poor energy efficiency.

It is also pertinent that in most chemical processes, back-mixed reactors have the disadvantage that there is always some small proportion of the effluent that has had a very long contact time and some proportion that has had a very short contact time. However, in crystallization operations, backmixing is advantageous in that it is self-seeding. More specifically, conditions can be controlled so that the relatively long contact time portion has an opportunity to nucleate, so that it can seed the contents of the entire reactor.

Although continuous crystallization does have many advantages, improvements thereon are needed to impart additional flexibility and controllability to the crystallizing operation. In addition, a large inventory is needed to achieve such flexibility and controllability and to have what is essentially insurance against emergencies and large variations in order patterns. However, while maintaining such an inventory, it is essential to provide enough agitation to prevent the formation of a continuous gel and the setting of such a gel which would immobilize the crystallizer contents.

SUMMARY OF THE INVENTION

It is accordingly an object of this invention to provide a continuous crystallzing process having enough agitation to prevent the formation of a continuous gel and the setting of such a gel which would immobilize the crystallizer contents.

It is another object to provide a means for flexibility in selecting the type of zeolite and/or the crystal size and other useful properties.

It is also an object to provide a means for controlling the rate of production of any desired zeoite and desired crystal size without interference with other operational needs.

In fulfillment of these objects and in accordance with the principles of this invention, it has surprisingly been discovered that the population growth law, for expressing the rate of growth of new crystal, has another dimension which is uniquely useful for this invention. According to this discovery, the type of crystals, the crystallization rate, and the crystal size are all controllable, if the initial crystal weight at the beginning of crystallization, $C_i$, is not allowed to exceed 15% by weight of solids while the total solids content is at least 10% by weight. However, if one or more of these desirable operational conditions is exceeded, the crystallization goes beyond control.

The crystallization process of this invention therefore recognizes that the crystallization process for highly siliceous zeolites should involve several stages. The first should be an induction stage in which a precursor or crystallization directing agent is formed and nucleation occurs. This agent may be partially crystalline and have a composition different from the final highly siliceous product or may have the same composition. In the second stage, nucleation continues and crystallization is accelerated. The final or finishing stage, which is usually conducted at higher temperatures, is the stage wherein the rate of crystallization is high and the remaining nutrients in the reaction mix that can react to form the zeolite are consumed. Depending upon the desired nature of the final product, however, all three stages may not be needed. In addition, some of the crystallization stages can be combined into one process step.

As a part of the controllability and flexibility requirements of this process, introduction of seed crystals in various steps of the process is preferred. It is well known that the incorporation of selected seed crystals in a continuous crystallization process can accelerate and direct the crystallization. It is therefore preferred to introduce selected seed crystals in various steps of the process and at various times during the crystallizing steps in order to improve product quality or production rate or to obtain a specific product.

The crystallization process of this invention thus involves several stages. The first is a continuously operated induction stage in which a precursor or crystallization directing agent is formed as a slurry having no more than 15% crystals by weight of the solids and in which the total solids content is greater than 10% by weight of the slurry. This precursor slurry is maintained in sufficiently large quantity as to provide a large supply inventory for a wide variety of contingencies. The second stage is the initial stage of crystallization in which nucleation is favored over crystal growth. This second stage is always in a separate vessel of generally much smaller size than the induction stage. The final or finishing stage, which is usually in another separate vessel but which may be conducted in the same vessel as the second stage, is usually conducted at higher temperatures than the second stage and is a stage wherein the rate of crystallization is increased and the remaining nutrients in the reaction mix can react to form the desired highly siliceous zeolite. Depending, however, upon the desired nature of the final product, all three stages may not be involved. In addition, some of the crystallization stages may be combined into one process step, such as the second stage and the final stage.

The minimum number of vessels for carrying out the continuous process of the invention is two, one for the induction period at a lower temperature than that for crystallization, and one for complete crystallization. Nevertheless, at least three vessels are preferred. The maximum number of vessels is determined by production criteria and the desired characteristics of the crystalline products, e.g., crystal size, crystallization time, and the tolerable degree of back mixing in the system.

The first vessel should be capable of thoroughly homogenizing the reaction mixtures; therefore, it should have high shear agitation capability. This agitation capability can be characterized in terms of the power input per unit volume of the reaction mixture and geometric considerations of the agitation system. Using the volume swept by the agitators per revolution best describes the situation. Based upon experience with small vessels of 5 and 30 gallon capacity and for larger vessels having impeller diameters of about 6 feet, it has been demonstrated that the Volume Swept/Volume of Reaction Mixture ($V_S/V_R$) should be $>0.12$. For these vessels, the power input per unit volume, P/V, should be greater than 0.005 HP/gal in order to provide sufficient agitation. In general, it may be stated that P/V should be more than 0.005 when $V_S/V_R$ is at least 0.12.

The other vessels in which crystallization is conducted should have the capability of a variable degree of agitation, ranging from high shear for small crystal production to a much lower degree of agitation, sufficient merely to effect heat transfer, for large crystal production. The power requirements for satisfactory agitation in the latter stages of crystallization will be at least 10% less than those already stated. In addition, all vessels should preferably be baffled in such a way as to prevent bypassing of the liquids therein. Therefore, entry and exit lines should be separated by baffles as necessary to insure thorough mixing.

The operation of the first stage vessel should normally be at a temperature varying from sub-ambient up to about 180° F. The holding time in this vessel should be from four to sixteen hours. Seed crystals can be introduced during this induction period to accelerate or direct the crystallization. The crystalline content of the solids in the precursor slurry from the first stage should not exceed 15% by weight while the total solids content should be greater than 10% by weight.

Acids such as HCl, $HNO_3$, and $H_2SO_4$, bases such as alkali metal and quaternary ammonium hydroxide, and appropriate N- or P-containing organic compounds, depending upon the zeolite product phase desired, can similarly be added. Such solutions of acids and bases can be used to alter the pH at varying stages of crystal growth. Soluble salts can be added to reduce silica occlusion in the crystalline product. Nutrients such as solutions of sodium silicate and silica sol can be used to produce crystals having an outer shell essentially free from aluminum. In addition to these nutrients, aluminum sulfate and sodium aluminate can be injected in order to change crystallite composition. Modifiers such as quaternary ammonium compounds and amines of $pK_a$ greater than about 7 may be injected subsequent to crystal formation and even subsequent to heating.

The crystallization vessels should operate at temperatures greater than 180° F. and at pressures from autogenous to 400 psig. Particularly if multiple crystallization stages are used, the first crystallization vessel (second stage) should operate in the range of 180°-250° F. and the subsequent stages at more than 250° F. The holding time for the first crystallization stage should be from 2 to 72 hours, depending upon the crystal size of the product that is desired and whether there are multiple crystallization stages. The holding time in each of the subsequent crystallization stages should be from 2 to 16 hours. Seed crystals and/or additional reactants can be introduced into the first crystallization step.

A slurry of zeolite is produced at the outlet of the final stage of crystallization, and the zeolite is separated from the mother liquor by known methods such as decantation, centrifugation, or filtration. The product crystals may be washed with water and dried at temperatures of about 110° C. for up to 24 hours or they may be used directly for adsorbent manufacture.

DESCRIPTION OF THE PREFERRED EMBODIMENTS

FIGS. 1-5 schematically show five preferred reactor schemes, A-E. FIG. 6 is a plan view of a design embodying all of schemes A-E as a composite plant capable of producing a wide variety of products with maximum flexibility of operation, beginning with a central precursor tank which is seen in detail in FIG. 7.

Figure 1:
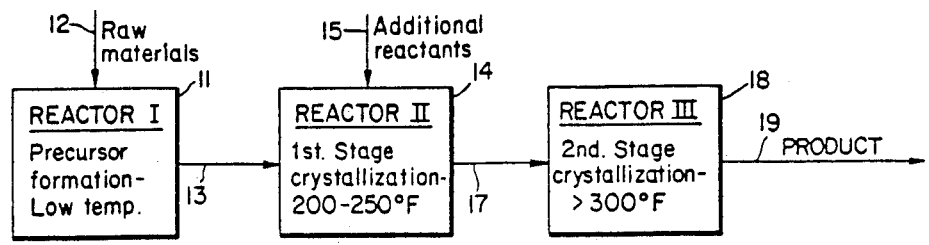
FIG. 1 is a schematic flow sheet which shows three reactors being utilized for precursor formation, first stage crystallization, and second stage crystallization of highly siliceous zeolites.

As seen in FIG. 1, Reactor I, Reactor II, and Reactor III are stirred tanks 11, 14, 18 which are held at selected temperatures and agitated selectively to produce a desired product in line 19 to embody Scheme A. Specifically, tank 11 receives raw materials through line 12 and is maintained at a temperature below 200° F., such as sub-ambient up to about 195° F., for a holding time of 4-16 hours. The temperature, pressure, and holding time are adjusted so that the crystalline content of the solids in influent 13 from Reactor tank 11 never exceeds 15% by weight of the total solids content which is at least 10% by weight of the slurry in line 13. Reactor II, as stirred tank 14, receives additional reactants through line 15 and is held at 200°-250° F. for the first stage of crystallization at pressures from autogenous up to 400 psig. The holding time in tank 14 is 2-72 hours, depending upon the desired crystal size of the product and the number of subsequent stages after Reactor II. Stream 17 leaves tank 14 and enters tank 18 which is Reactor III where the second stage of crystallization occurs at a temperature greater than 300° F. and at a corresponding autogenous pressure. The final product leaves through line 19 for filtering, drying, and packaging.

Figure 2:
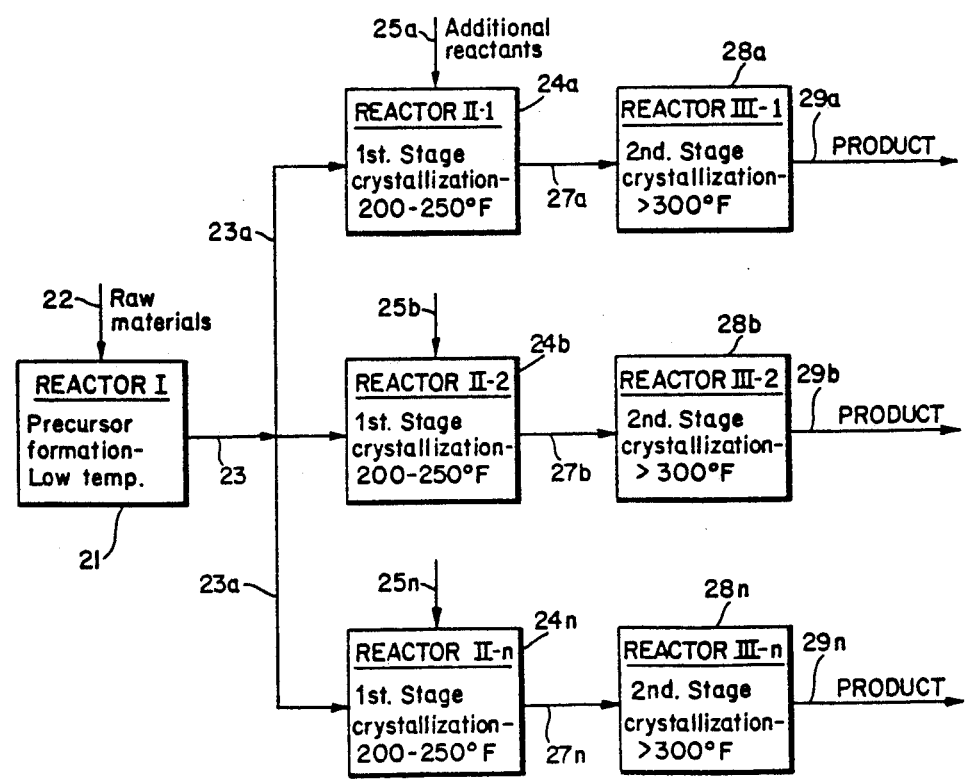
FIG. 2 is another schmematic flow sheet, involving a much larger number of reactors but still using three stages, in which the first reactor is used for building up a large inventory of dilute precursor slurry for feeding to three first-stage crystallization reactors in parallel and then to three second-stage crystallization reactors in parallel, additional reactants being added to the first crystallization stage.

FIG. 2 schematically illustrates the use of replicate crystallizations following Reactor I, by utilizing several parallel stages for Reactor II and Reactor III to embody Scheme B. Reactor I is used for precursor formation at a low temperature up to about 180° F. and takes place in rapidly stirred tank 21 which receives raw materials through line 22. Precursor materials leave through lines 23,23a and enter tanks 24a,24b,24n, receiving additional reactants through lines 25a,25b,25n. Effluents leave tanks 24a,24b,24n through lines 27a,27b,27n to enter tanks 28a,28b,28n wherein the second stage of crystallization occurs at temperatures greater than 300° F. and at autogenous pressures producing products through respective lines 29a,29b,29n.

Figure 3:
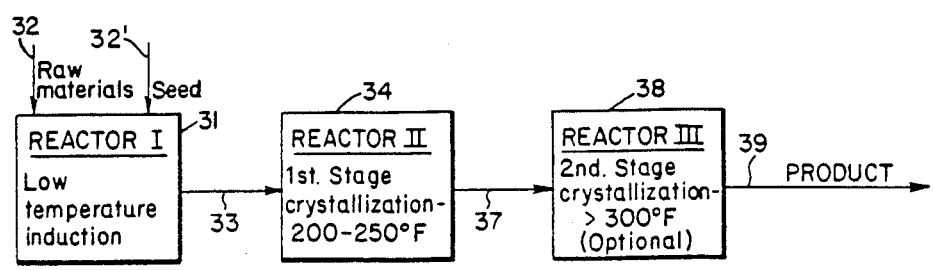
FIG. 3 is a schematic flow sheet showing the utilization of three reactors in which both raw materials and seed are added to the precursorforming first reactor wherein low-temperature induction creates the dilute precursor inventory.

As seen in FIG. 3, Scheme C comprises Reactors I, II, and III in respective tanks 31,34,38. Tank 31 receives raw materials through lines 32 and 32' for low temperature induction and production of precursor material sent through line 33 to tank 34 wherein the first stage of crystallization occurs at temperatures of 200°-250° F., producing partially crystallized slurry sent through line 37 to tank 38 wherein the second stage of crystallization occurs at temperatures greater than 300° F., if desired, producing product which is pumped through line 39 for filtering, drying, and packaging.

Figure 4:
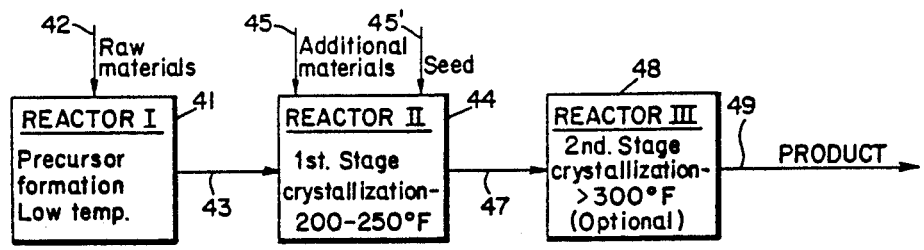
FIG. 4 is a schematic flow sheet involving three reactors in which the first reactor receives only raw materials for forming the dilute precursor slurry at low temperature and the second reactor receives additonal materials as well as seed for first-stage crystallization.

Scheme D is shown in FIG. 4, wherein Reactors I, II, and III are stirred tanks 41,44,48. Tank 41 receives its raw materials through line 42 and sends its precursor slurry through line 43 to tank 44 which also receives additional materials through line 45 and seed through line 45'. With selected stirring, first stage crystallization occurs at 200°-250° F., producing a partially crystallized slurry which is sent through line 47 to tank 48 wherein the second stage of crystallization occurs at temperatures greater than 300° F., if needed, to produce product sent to filtering, drying and packaging through line 49.

Figure 5:
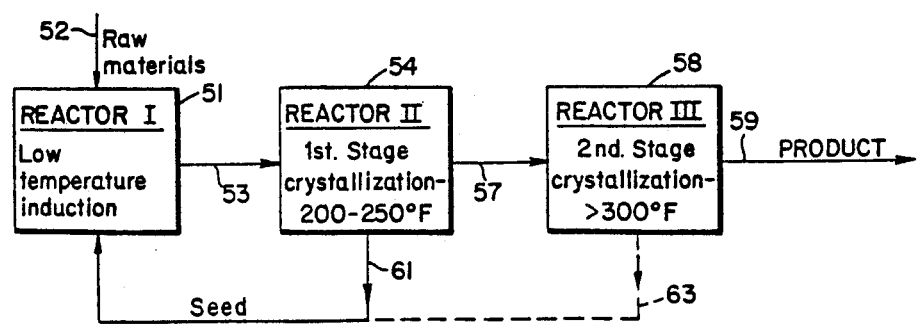
FIG. 5 is a schematic flow sheet involving three stages in which back mixing from the second stage to the first stage provides seed for low temperature induction to form the dilute precursor slurry and in which back mixing from the second crystallization stage in the third reactor can also be utilized as such seed for the first reactor.
Figure 6:
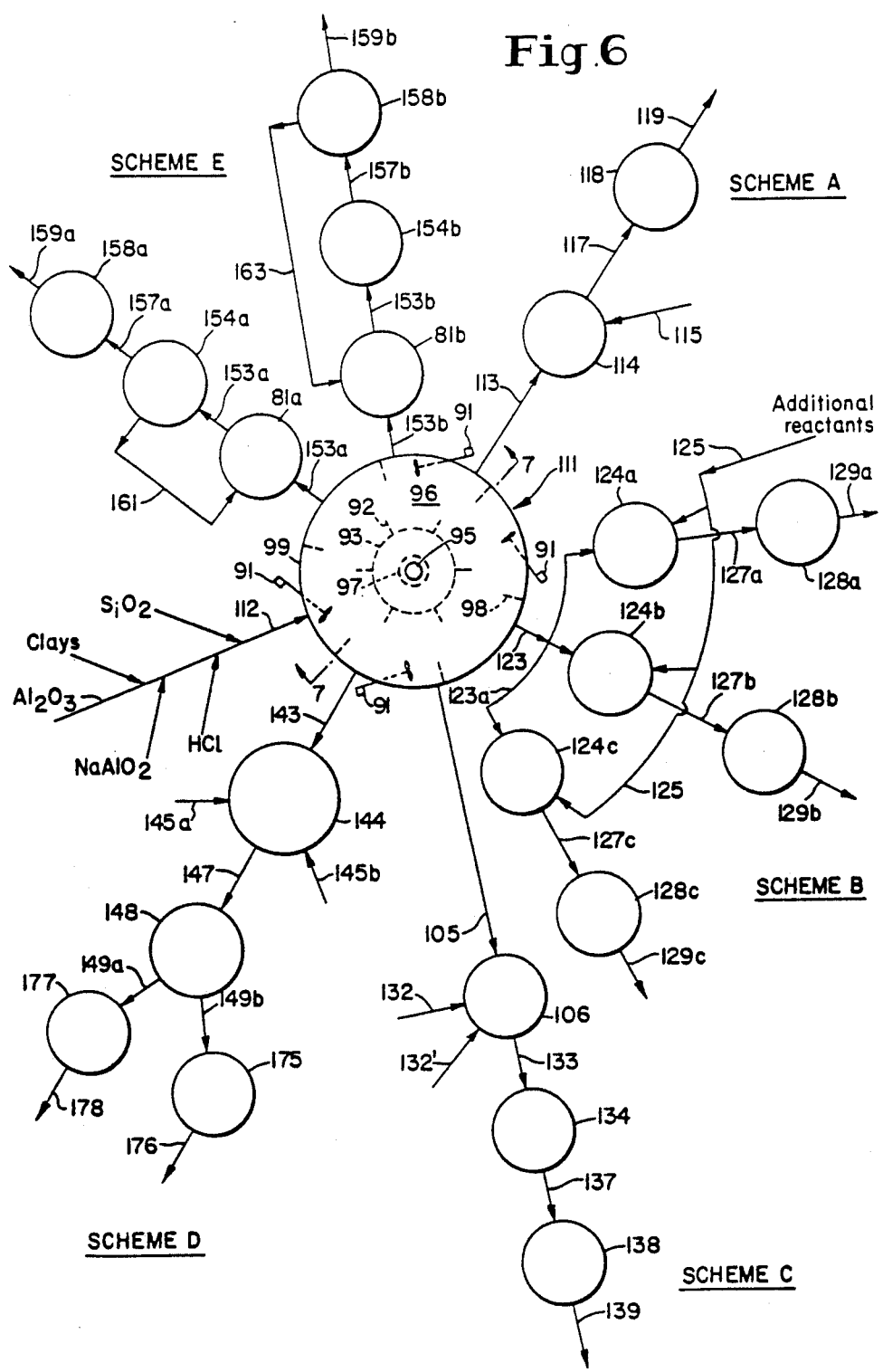
FIG. 6 is a plan view of a zeolite manufacturing operation which utilizes a very large central holding tank for precursor formation and numerous medium and small tanks for manufacturing various zeolites in selected crystal sizes and having selected properties in various quantities according to market demand therefor, the tanks being disposed and connected so that all of the five schemes are utilized according to FIGS. 1-5. In some instances, auxiliary holding tanks are connected to the central holding tank in order to admix raw materials and/or seed as a part of precursor formation at relatively low temperatures.

Scheme E is embodied in the schematic flow sheet seen in FIG. 5, wherein Reactors I, II, and III are stirred tanks 51,54,58. Tank 51 receives raw materials through line 52 and is held at a low temperature for precursor induction. The precursor slurry is sent through line 53 to tank 54 wherein first-stage crystallization occurs at 200°-250° F. while producing crystals which are sent to tank 58 through line 57, a portion also being returned through line 61 to tank 51 as seed therefor. In tank 58, the second stage of crystallization occurs at temperatures greater than 300° F. and at autogenous pressures with a portion of the final product being sent through line 63, if desired, to tank 51 as seed material, the remainder being sent through line 59 as product for filtering, drying, and packaging.

Figure 7:
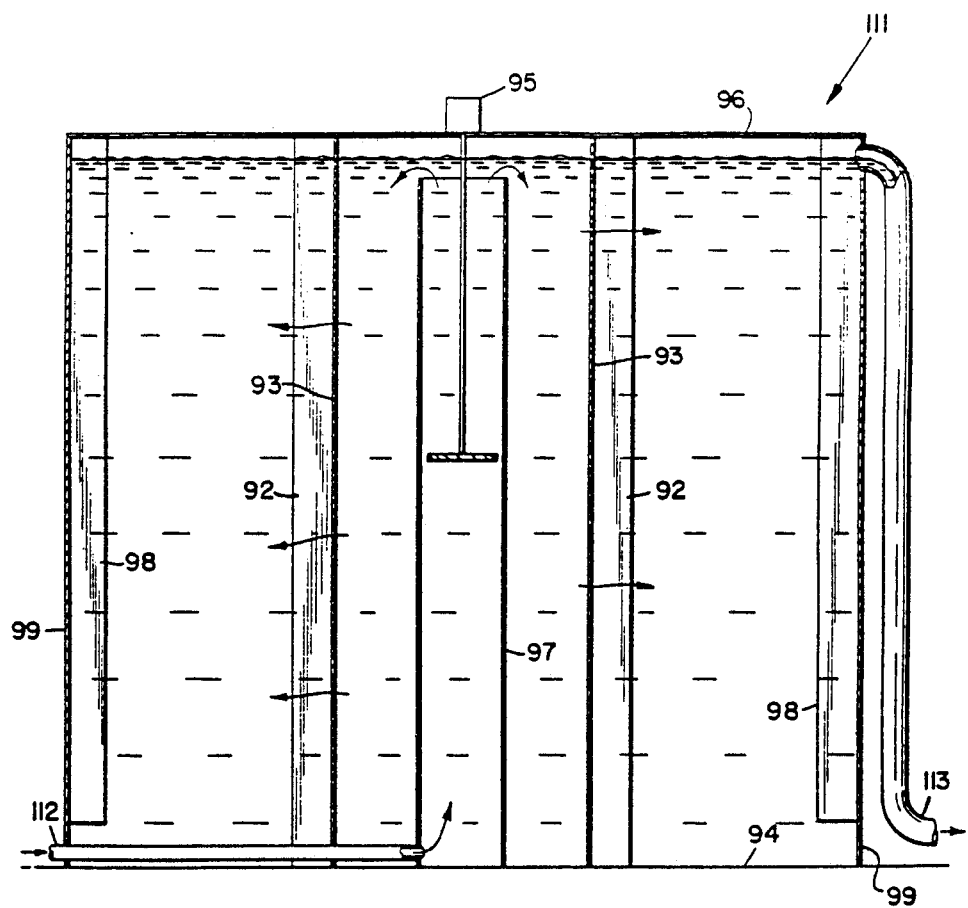
FIG. 7 is a sectional elevational view of the large precursor tank in the center of FIG. 6, looking in the direction of the arrows 7—7 in FIG. 6.

The composite zeolite plant seen in FIGS. 6 and 7 illustrates the type of plant layout which is feasible according to the principles of this invention and which embodies the objects thereof for making a wide variety of highly siliceous zeolites. Because the large precursor tank 111, (representing tanks 11,21,31,41,51 in FIGS. 1-5) is being fed continuously with raw material through feed line 112 (representing feed lines 12,22,32,42,52 in FIGS. 1-5), its contents are being stirred by agitators 91,95 which have high shear agitation capability and are capable of thoroughly homogenizing the reaction mixture.

The feed materials entering through feeder lines (five of which are illustratively shown in the drawing) to main feed line 112 comprise (a) selected $SiO_2$ source materials, such as sodium silicate, colloidal silica dispersions, solid silicas, silicic acid, quaternary ammonium silicates, or tetraalkyl-orthosilicates; (b) selected $Al_2O_3$ source materials, such as sodium aluminate, aluminum sulfate, nitrate, or chloride, or aluminum tri-alkyoxides; (c) acids, such as HCl, $HNO_3$, or $H_2SO_4$; and (d) bases such as alkali metal or quaternary ammonium hydroxides. Materials serving as diluents and binders and/or as sources of $SiO_2$ and/or $Al_2O_3$, such as naturally occurring clays and minerals of $SiO_2$, $Al_2O_3$, or $SiO_2$-$Al_2O_3$, can be added to tank 111 but are preferably added to an auxiliary precursor tank or to the finished zeolite product after filtering and washing. These materials are varied as to source and quantity according to market prices, availability, effect upon $OH/SiO_2$ ratios, content of N- or P-containing organic compound, and the like and are generally controlled by a computer to which data on the order pattern, costs of raw materials, capacities of the tanks, composition of the precursor slurry, and the like are continually fed. The computer additionally controls temperature, agitation power input, and holding times for tank 111 according to the requirements that its output slurry, when leaving tank 111 through its product lines 113,123, 105,143,153a, and 153b, have a total solids content that is greater than 10% by weight of the slurry and a crystalline content of the solids that is below 15% by weight of the total solids content.

EXAMPLE

Tank 111 is shown in elevational crosssection in FIG. 7. It comprises an outer cylindrical wall 99 which is approximately 50 feet in height, a cover 96, and a turbine mixer 95 which is coaxially mounted on cover 96 and operates within a vertically disposed updraft tube 97 which is attached to bottom 94 of tank 111 but comes to within three feet of cover 96. Updraft tube 97 also receives raw materials through inflow line 112 at its bottom. The thoroughly homogenized and mixed material overflows the top of updraft tube 97 into the annular space within perforated cylinder 93 which is in coaxial relationship to updraft tube 97. Updraft tube 97 is six feet in diameter, and cylinder 93 is 18 feet in diameter. Cylinder 97 is 47 feet in height, but cylinder 93 is 50 feet high. The liquid surface is maintained at two feet below top 96 and is under a pressure varying from 0 to 10 psig and 70° to 180° F. At this depth, the tank holds 705,000 gallons of a slurry which varies in temperature between 200° F. and 250° F.

Six baffles 92, extending from floor 94 to cover 96 and each having a width of three feet, are attached to the outside surface of cylinder 93. Within the 20-foot wide annular space between walls 93,99, six baffles 98 are also attached to roof 96 and walls 99, extending downwardly to within three feet of floor 94. To provide circulation at high velocity, four side-mounted propellers 91 are located non-radially on horizontal shafts through openings in side 99 and are provided with adequate bearings and stuffing boxes. Although not shown in FIG. 7, it is to be understood that appropriately sized and disposed valves, which may be motor operated and under control of a computer, are suitably disposed for controlling pressures and volumes within Tank 111 and for controlling flows of materials into and out of this tank.

Beginning with Scheme A (shown in FIG. 1) and proceeding clockwise around tank 111 in FIG. 6, a portion of the precursor slurry is sent through line 113 to tank 114 which also receives additional reactants through line 115 and is held at 225° F. and 40–50 psig as a batch operation for 8.5 hours. The partially crystallized slurry is sent through line 117 to tank 118 wherein crystallization is completed at 325° F. and 150–170 psig during a holding time of ten hours. The product slurry is sent through line 119 for further processing.

Another portion of the precursor slurry in tank 111 is sent through lines 123,123a to crystallization tanks 124a,124b,124c of Scheme B which are each held at 240° F. and 60–70 psig and which each receive additional reactants through line 125.

TABLE I

| | TIME AND TEMPERATURE CONDITIONS IN EXAMPLE BEYOND TANK NO. 111 | | | | | | | | | |
|---|---|---|---|---|---|---|---|---|---|---|
| | Auxiliary Precursors | | First Stage | | | Second Stage | | | Third Stage | | |
| Scheme | Tank No. | Temp., °F. | Tank No. | Temp., °F. | Holding Time, hrs. | Tank No. | Temp., °F. | Holding Time, hrs. | Tank No. | Temp., °F. | Holding Time, hrs. |
| A | — | — | 114 | 225 | 8.5 | 118 | 325 | 10 | — | — | — |
| B | — | — | 124a | 240 | 2.5 | 128a | 345 | 2.25 | — | — | — |
| | | | 124b | 240 | 2.5 | 128b | 345 | 2.25 | — | — | — |
| | | | 124c | 240 | 2.5 | 128c | 345 | 2.25 | — | — | — |
| C | 106 | 180 | 134 | 210 | 21 | 138 | 260 | 15 | — | — | — |
| D | — | — | 144 | 230 | 12 | 148 | 280 | 9 | 177 | 350 | 14 |
| | | | | | | | | | 175 | 370 | 16 |
| E | 81a | 180 | 154a | 185 | 61 | 158a | 300 | 11 | — | — | — |
| | 81b | 170 | 154b | 195 | 35 | 158b | 315 | 5 | — | — | — |

After holding for 2.5 hours, the products are sent through lines 127a,127b,127c to second-stage crystallization tanks 128a,128b,128c wherein crystallization is completed at 345° F. and 200 psig for 2.25 hours. The final slurry is sent through lines 129a,129b, 129c for final processing, thus embodying Scheme B (shown in FIG. 2) in the composite zeolite plant of this invention. Any of these tanks, such as 124b, 128b, can be operated at different temperatures and different holding times than the other tanks in Scheme B.

An additional portion of the precursor slurry in tank 111 is sent through line 105 to auxiliary precursor tank 106 which receives certain raw materials through line 132 and seed through line 132' and is held at 180° F. and 30 psig while being vigorously stirred with a high degree of shear for small crystal production. The precursor product is sent through line 133 to first crystallization tank 134 which is held at 210° F. and 40 psig for 21 hours. The product is sent through line 137 to crystallization tank 138 for the final crystallization at 260° F. and 100–110 psig for 15 hours. The product is sent through line 139 for further processing, ending in packaging and shipment. This series of three tanks therefore embodies Scheme C (shown in FIG. 3) in the composite zeolite plant.

A fourth portion of the precursor slurry in tank 111 is sent through line 143 which feeds tank 144 which is held at 230° F. and 50–60 psig for 12 hours as a first stage for growing crystals, after having been fed with additional materials through line 145a and with seed through line 145b.

TABLE II

| | Exemplary Areas and Volumes for Two Tanks in Scheme A | | | | | |
|---|---|---|---|---|---|---|
| Tank | Agitator Area, in² | Baffle Area, in² | Volume, gal | Power Input, HP | A/V, in²/gal | P/V, HP/gal |
| 1. 114 | 1220 | 1550 | 2300 | 100 | 1.2 | 0.043 |

TABLE II-continued

Exemplary Areas and Volumes for Two Tanks in Scheme A

| | Tank | Agitator Area, in² | Baffle Area, in² | Volume, gal | Power Input, HP | A/V, in²/gal | P/V, HP/gal |
|---|---|---|---|---|---|---|---|
| 2. | 118 | 1220 | 1550 | 2300 | 50–100 | 1.2 | 0.022–0.043 |
| 3. | 114 | 84 | 56 | 25.0 | 3 | 5.6 | 0.12 |
| 4. | 118 | 84 | 56 | 25.0 | 1–3 | 5.6 | 0.04–0.12 |

The slurry product from tank 144 is sent through line 147 to second-stage crystallizing tank 148 which is held at 280° F. and 100–110 psig for nine hours to produce a slurry which is then sent through lines 149a and 149b to third-stage crystallizing tanks 177 and 175, respectively, which are held at 350° F. and 40 psig and 370° F. and 250 psig, respectively, for 14 and 16 hours, respectively. The products are sent through lines 178 and 176, respectively, for further processing. This arrangement of four tanks in Scheme D (shown in FIG. 4) further illustrates the variety and flexibility of operation that is available in the composite zeolite manufacturing plant of this invention to provide a wide range of products.

Scheme E is shown in the upper left quadrant of FIG. 6 as two separate and independent operations. A portion of precursor slurry moves from tank 111 through line 153a to auxiliary low-temperature induction tank 81a where it is held at 180° F. and 30 psig for 10 hours while maintaining the crystalline content of the solids in the effluent at about 13% by weight of the total solids content which is between 10% and 20% by weight of the slurry. Precursor slurry is sent through line 153a to first-stage crystallization tank 154a which returns seed through line 161 to tank 81a. Tank 154a is held at 185° F. and 30–35 psig for 61 hours, and slurry is sent through line 157a to tank 158a which is held at 300° F. and 130 psig for 11 hours to produce a product sent for further processing through line 159a.

A final portion of slurry is sent through line 153b to auxiliary holding tank 81b which is held at 170° F. and 20–30 psig while maintaining the crystalline content of the solids at about 12% by weight and the total solids content at 20–22% by weight of the slurry. Precursor slurry is then sent through line 153b to tank 154b where it is held at 195° F. and 35–40 psig for 35 hours to produce slurry sent through line 157b to tank 158b which is held at 315° F. and 150–160 psig for five hours to produce seed which is returned through line 163 to tank 81b and final product which is sent through line 159b for final processing. These six tanks therefore embody scheme E, as seen in FIG. 5, illustrating the versatility of seed formation and seed feedback to an auxiliary holding tank without disturbing or influencing main holding tank 111.

Time and temperature conditions for Schemes A-E are summarized in Table I. Suitable agitator and baffle areas for tanks 114,118 in Scheme A are given in Table II, assuming an exemplary moderate size and an exemplary very small size for each tank. Because the power requirements for satisfactory agitation in the latter stages of crystallization are less than in the early stages, tank 118 is stirred with as little as one third of the power required for stirring tank 114.

Calculated A/V and P/V ratios for these tanks are also furnished in Table II. The A/V value for the 2,300-gallon tanks are 1.2 square inches per gallon, well below the limiting design value of 2 in.²/gal, and the A/V value for the 25-gallon tanks are 5.6 square inches per gallon. The P/V values are in each instance well above the minimum power inputs per unit volume of 0.015 HP/gal and 0.005 HP/gal, respectively.

Schemes A–E are combined in FIG. 6 as a continuously operated plant for making highly siliceous zeolites because the very large capacity of tank 111 and the variability of feeds into line 112 enable flow rates and material sources to be controlled automatically. Each of these sources can be in a separate supply tank and can be fed alternately or simultaneously to tank 111 to maintain the desired balance in tank 111 or can be sent through auxiliary lines 115,125,132,145 to individual holding tanks or to first stage crystallization tanks, as desired. Flow control valves and separate lines can readily facilitate automatic delivery to tank 111 or to auxiliary holding tanks 106,81a,81b.

We claim:

1. A method for preparing a variety of crystalline zeolites having selected crystal sizes, compositions, and pore sizes within a continuous manufacturing plant, comprising:

A. forming a precursor slurry within a precursor tank which is held, as an induction stage, at a temperature below 200° F. for from 4 to 16 hours while crystallization nutrients and modifiers are continuously fed thereto to form a reaction mixture which is thoroughly and continuously homogenized with high shear agitation to produce said precursor slurry having a total solids content that is above 10% by weight of the slurry and a synthetic crystalline siliceous solid content not exceeding 15% by weight of said total solids content; and B. crystallizing said zeolites therein at temperatures greater than 180° F. and at pressures from autogenous to 400 psig for at least two hours in a first crystallization stage and at least one additional crystallization stage, wherein said first crystallization stage is operated in a separate reaction vessel from said at least one additional crystallization stage and wherein said at least one additional crystallization stage is conducted at a higher temperature than said first crystallization stage, and wherein the contents of said at least one additional crystallization stage are partially and selectively backmixed to said first crystallization stage.

2. The method of claim 1, wherein said high shear agitation is provided by agitators providing more than 0.005 horsepower per gallon and the Volume Swept/Volume of Reaction Mixture ($V_S/V_R$) is >0.12.

3. The method of claim 1, wherein said precursor tank is held at a temperature from sub-ambient up to about 180° F.

4. The method of claim 1, wherein said first crystallization stage is at a temperature in the range of 180°–250° F. for a holding time in the range of from 2 to 72 hours.

5. The method of claim 4, wherein nucleation occurs in said first crystallization stage.

6. The method of claim 5, wherein said first crystallization stage is conducted in a separate vessel of much smaller size than said precursor tank.

7. The method of claim 1, wherein said at least one additional crystallization stage is at a temperature greater than 250° F. for a holding time in the range of from 2 to 16 hours.

8. The method of claim 7, wherein said at least one additional crystallization stage is at a temperature greater than 300° F.

9. The method of claim 1, wherein the power requirements for agitation in said at least one additional crystallization stage are at least 10% less than for agitation in said first crystallization stage.

10. The method of claim 1, wherein said precursor slurry is fed to an auxiliary precursor tank which receives additional raw materials and seed and is held at about 180° F., while being stirred with a high degree of shear for small crystal production, before being fed to at least one first crystallization stage.

11. The method of claim 1, wherein said vessel from said first crystallization stage and that from said at least one additional crystallization stage are serially disposed and are operated in parallel, each being in flow connection with said precursor tank.

12. The method of claim 11, wherein said zeolites, produced according to said schemes, comprise highly siliceous zeolites.

13. A method for preparing a variety of crystalline zeolites having selected crystal sizes, compositions, and pore sizes within a continuous manufacturing plant, comprising:
   A. forming a precursor slurry within a precursor tank which is held, as an induction stage, at a temperature below 200° F. for from 4 to 16 hours while crystallization nutrients and modifiers are continuously fed thereto to form a reaction mixture which is thoroughly and continuously homogenized with high shear agitation, which is produced by agitators providing more than 0.005 horsepower per gallon when the volume swept by the agitators divided by the volume of the reaction mixture (Vs/Vr) is at least 0.12, to produce a precursor slurry having a total solids content that is about 10% by weight of the slurry and a synthetic crystalline siliceous solid content not exceeding 15% by weight of said total solids content, said slurry being maintained in sufficiently large quantity to produce a wide variety of highly siliceous zeolites; and
   B. feeding said precursor slurry to a plurality of primary crystallization vessels each of said primary crystallization vessels being serially connected to at least one secondary crystallization vessel to form, overall, a plurality of series for stagewise crystallization, each said series being in flow connection with said precursor tank and the contents of at least one of said crystallization vessels in any said series being partially and selectively backmixed to a preceding crystallization vessel in said series, and crystallizing said zeolites therein at temperatures greater than 180° F. and at pressures from autogenous to 400 psig for at least two hours, said crystallization vessels being operated in two crystallizing stages, the first crystallizing stage being at a temperature in the range of 180°–250° F. for a holding time in the range of from 2 to 72 hours, and the second crystallizing stage being at a temperature greater than 250° F. for a holding time in the range of from 2 to 16 hours.

14. The method of claim 13, wherein:
   A. each first crystallization vessel is of much smaller size than said precursor tank;
   B. nucleation is favored over crystal growth in said first crystallizing stage;
   C. the rate of crystallization in said second crystallizing stage is increased relative to said first crystallizing stage; and
   D. the power requirements for agitation in said second stage are at least 10% less than for agitation in said first stage.

15. A method for preparing crystalline zeolites having selected crystal sizes, comprising the steps of:
   forming a precursor slurry within a precursor tank which is held, as an induction stage, at a temperature below 200° F. for from 4 to 16 hours while crystallization nutrients and modifiers are continuously fed thereto to form a reaction mixture which is thoroughly and continuously homogenized with high shear agitation to produce said precursor slurry having a total solids content that is above 10% by weight of the slurry and a synthetic crystalline siliceous solid content not exceeding 15% by weight of said total solids content;
   feeding said precursor slurry to at least one crystallization vessel and crystallizing said zeolites therein at temperatures greater than 180° F. and at pressures from autogenous to 400 psig for at least two hours; and
   returning a portion of the contents of said at least one crystallization vessel to said precursor tank.

* * * * *